June 24, 1930.  H. D. EDIGER  1,766,492
CORN SHELLER BLOWER
Filed Dec. 3, 1928  3 Sheets-Sheet 1
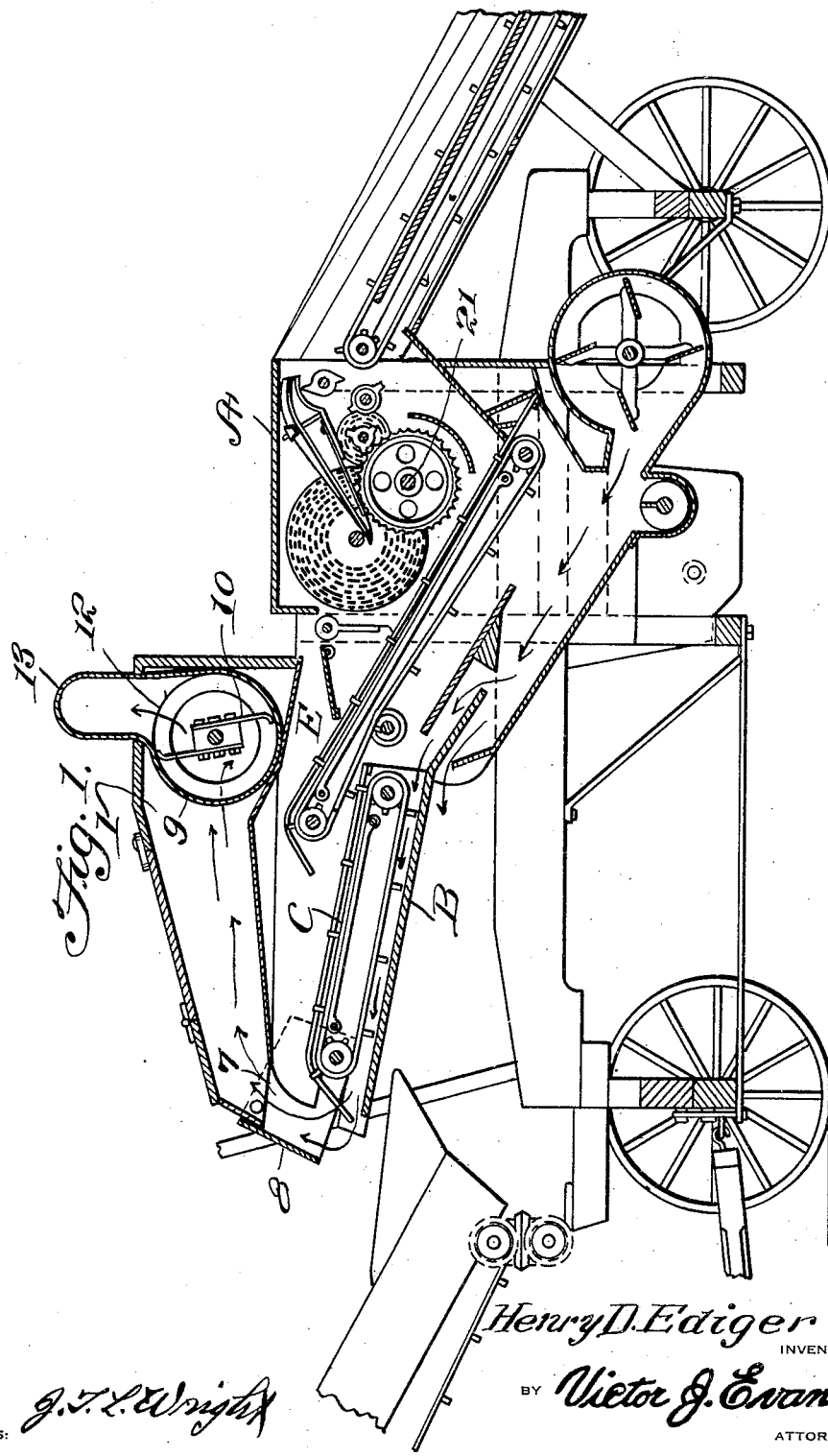

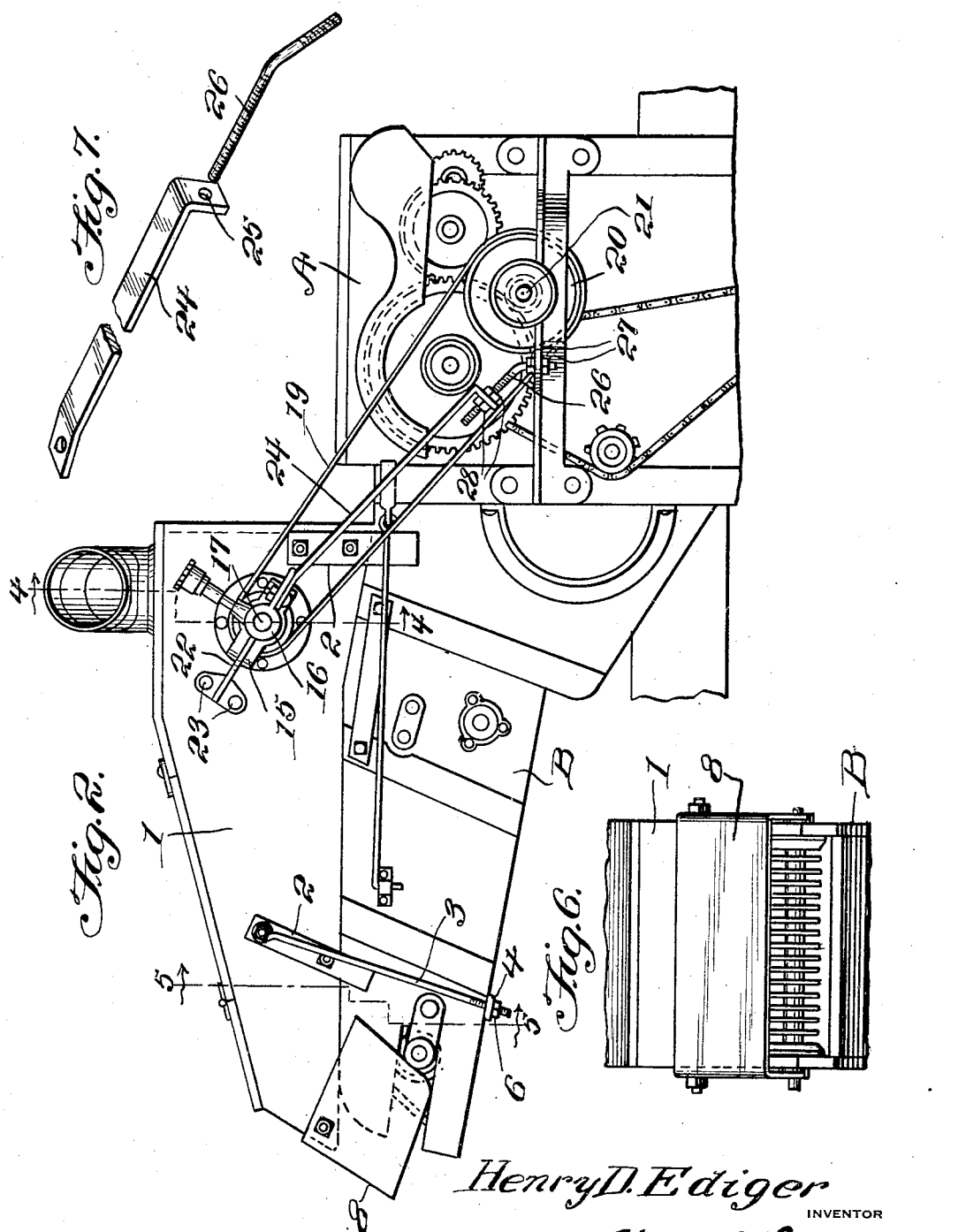

June 24, 1930.                H. D. EDIGER                1,766,492
                            CORN SHELLER BLOWER
                          Filed Dec. 3, 1928          3 Sheets-Sheet 3
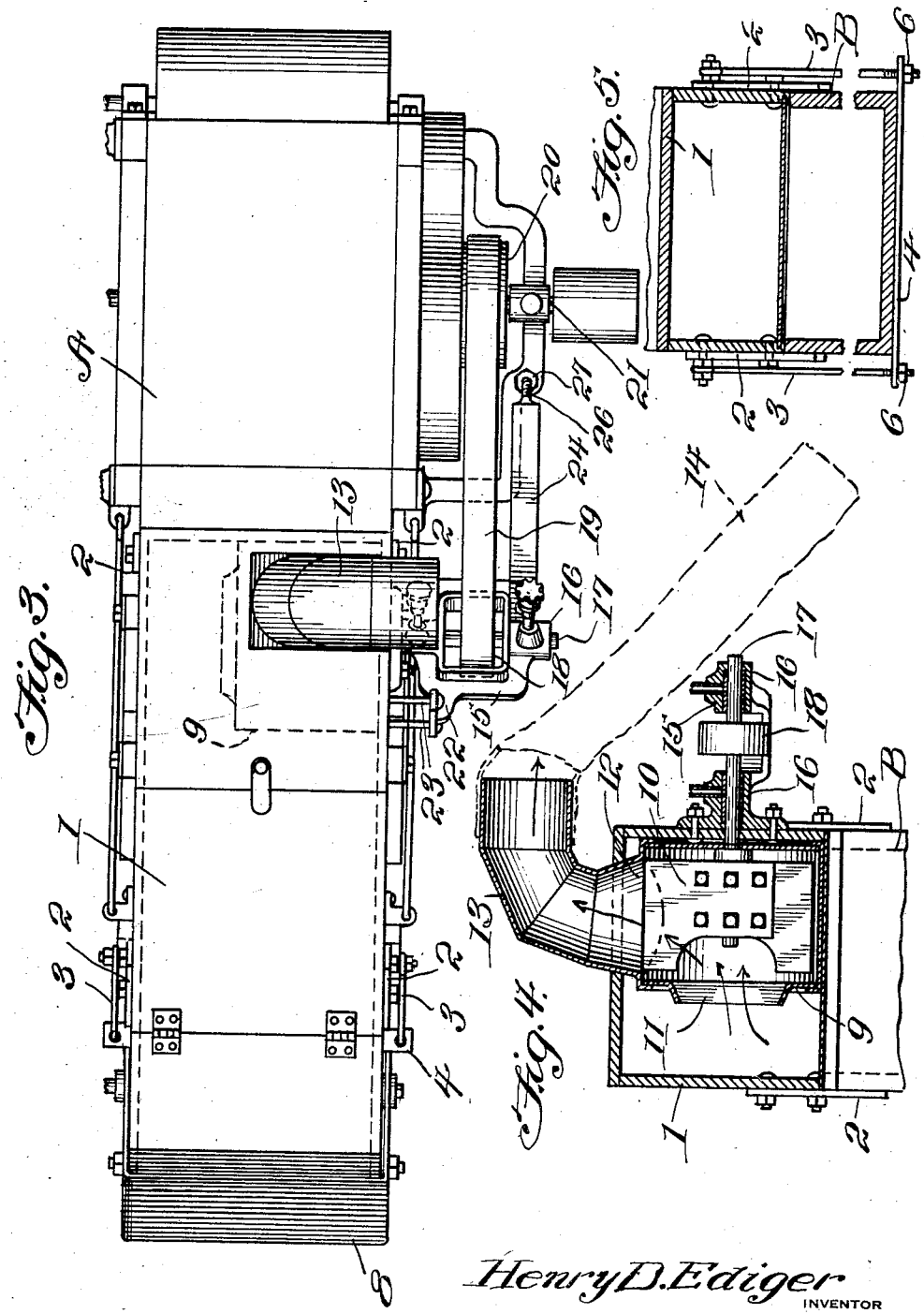

Patented June 24, 1930

1,766,492

UNITED STATES PATENT OFFICE

HENRY D. EDIGER, OF HENDERSON, NEBRASKA

CORN-SHELLER BLOWER

Application filed December 3, 1928. Serial No. 323,301.

This invention relates to a blower for a spring corn sheller, the general object of the invention being to provide means for removing the chaff, particles of husks and other foreign matter from the cob discharge end of the sheller so that this trash will not be delivered on to the cob pile, with means for enabling the blower device to be easily and quickly removed from the sheller whenever desired or necessary.

Another object of the invention is to provide means for adjusting the blower casing so as to tighten the belt which drives the blower shaft from the power shaft of the sheller.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a longitudinal sectional view through a sheller, showing the invention in use thereon.

Figure 2 is an elevation.

Figure 3 is a top plan view.

Figure 4 is a section on line 4—4 of Figure 2.

Figure 5 is a section on line 5—5 of Figure 2.

Figure 6 is an end view.

Figure 7 is a detail view of the belt tightening means.

In these views, the numeral 1 indicates a blower casing which is placed on the rear casing B of the corn sheller which is shown generally at A, this casing B containing the conveyor C which receives the cobs from the elevator E of the corn sheller and discharges them through the rear end of the casing B. This casing 1 is slidably held on the casing B by the strips 2 which are bolted to the casing 1 and extend over the sides of the casing B. A rod 3 is arranged at each side of the casing 1 and has its upper end formed with an eye to receive the top bolt which connects the rear strip 2 with the casing 1. A bar 4 extends transversely across the bottom of the casing B and has holes in its ends for receiving the lower threaded ends of the rods 3, nuts 6 on the threaded portions of the rods 3 holding the bar 4 in place. Thus the casing 1 is firmly held on the casing B, but is capable of limited longitudinal movement thereon.

The casing 1 is formed with an opening 7 in the rear part of its bottom and an apron 8 is attached to the rear end of the casing 1 and extends from the upper part of the rear end of the casing B so that the cobs and foreign matter passing off the conveyor C must pass under and partly through the passage formed by the opening 7 and the apron 8.

A cylinder 9 is arranged in the front end of the casing 1 at one side thereof and a double bladed fan 10 is arranged in this cylinder. The inlet 11 of the cylinder opens out into the casing 1 and its outlet 12 is in communication with a spout 13 to which may be attached a chute 14 of canvas or the like. Thus the suction created by the fan 10 will draw air through the rear end of the casing 1, thus drawing chaff, particles of husks and other foreign matter dropping from the conveyor C with the cobs, into the casing and this matter will pass through the fan and be discharged through the spout 13. Thus the cobs will be freed of this foreign matter and none of this matter will pass on to the cob pile.

A casting 15 is bolted to one side of the casing 1 and is formed with the bearings 16 for the shaft 17 which passes into the casing and cylinder and to which the fan blades are fastened. A pulley 18 is fastened to the shaft between the bearings and a belt 19 passes over said pulley and over a pulley 20 which is arranged on one of the shafts 21 of the sheller. The casting 15 is formed with a brace 22 which is bolted to the casing, as shown at 23. In order to tighten the belt, I provide means for adjusting the casing 1 on the casing B, such means comprising a bar 24 having one end fastened to the casting 15 and its other end is bent downwardly and formed with a hole 25 and a threaded rod 26 has its threaded part passing through the hole 25 and other end of this rod is bent downwardly and fastened to a part of the sheller frame by the nuts 27. A pair of nuts 28 on the rod 26 engage both faces of the bent end of the bar 24. Thus by loosening the upper nut 28 and tightening the other one, the bar 24 is moved longitudinally so that it will cause the casing 1 to slide to the left on the casing B and thus tighten the belt.

From the foregoing it will be seen that I have provided simple means for removing chaff and other foreign matter from the cobs as the cobs leave the sheller and it will also be seen that the blower casing can be easily removed when necessary by removing the nuts 6 from the rods 3 to release the bar 4. Then the entire blower casing can be removed from the sheller. By adjusting the casing 1 on the casing B, the belt 19 can be loosened or tightened, as desired.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In combination with a corn sheller, a blower casing slidably seated on the cob conveyor casing of the sheller, depending members on the side of said blower casing extending over the sides of the cob casing, means for movably and detachably connecting the lower casing to the cob conveyor casing, said blower casing having a passage in one end which is in communication with the cob discharge end of the cob conveyor casing, a fan cylinder in the other end of the blower casing at one side thereof, said cylinder having its inlet in communication with the casing, a discharge spout in communication with the discharge outlet of the cylinder, a fan in said cylinder, a casting connected with one side of the blower casing, a shaft journaled in the casting and connected with the fan, a pulley on the shaft, a belt passing over the pulley and over a pulley on one of the shafts of the sheller, a bar connected with the casting and having its other end bent downwardly, a threaded rod connected with the sheller and passing through the bent end and nuts on the rod engaging the bent end of the bar whereby when the nuts are moved, the bar will be moved to impart longitudinal movement to the blower casing.

In testimony whereof I affix my signature.

HENRY D. EDIGER.